US012620544B2

(12) United States Patent
Jafari et al.

(10) Patent No.: US 12,620,544 B2
(45) Date of Patent: May 5, 2026

(54) HYBRID MULTI-SOURCE X-RAY SOURCE AND IMAGING SYSTEM

(71) Applicants: VEC Imaging GmbH & Co. KG, Erlangen (DE); Varex Imaging Corporation, Salt Lake City, UT (US)

(72) Inventors: Houman Jafari, Erlangen (DE); Bo Gao, Morrisville, NC (US); Vance Scott Robinson, South Jordan, UT (US)

(73) Assignees: VAREX IMAGING CORPORATION, Salt Lake City, UT (US); VEC Imaging GmbH & Co. KG, Erlangen (DE)

( * ) Notice: Subject to any disclaimer, the term of this patent is extended or adjusted under 35 U.S.C. 154(b) by 0 days.

(21) Appl. No.: 18/748,076

(22) Filed: Jun. 19, 2024

(65) Prior Publication Data

US 2024/0339283 A1 Oct. 10, 2024

Related U.S. Application Data

(63) Continuation of application No. 17/177,038, filed on Feb. 16, 2021, now Pat. No. 12,046,442.

(Continued)

(30) Foreign Application Priority Data

Feb. 16, 2021 (EP) .................................... 21157470

(51) Int. Cl.

| | |
|---|---|
| ***H01J 35/14*** | (2006.01) |
| ***H01J 35/08*** | (2006.01) |
| ***H01J 35/12*** | (2006.01) |

(52) U.S. Cl.

CPC ........... *H01J 35/153* (2019.05); *H01J 35/112* (2019.05); *H01J 35/12* (2013.01); *H01J 35/147* (2019.05);

(Continued)

(58) Field of Classification Search

CPC ... H01J 35/153; H01J 35/147; H01J 2235/086

See application file for complete search history.

(56) References Cited

U.S. PATENT DOCUMENTS

| | | | | |
|---|---|---|---|---|
| 2,160,605 A | | 5/1939 | Suits | |
| 4,266,133 A | * | 5/1981 | Weigl | H05G 1/32 378/115 |

(Continued)

FOREIGN PATENT DOCUMENTS

| | | |
|---|---|---|
| CN | 1961399 A | 5/2007 |
| CN | 110530907 B | 12/2019 |

(Continued)

OTHER PUBLICATIONS

WO 2019/057338 A1 and its English translation (Year: 2019).*

(Continued)

*Primary Examiner* — Chih-Cheng Kao

(74) *Attorney, Agent, or Firm* — Dorsey & Whitney LLP

(57) ABSTRACT

Some embodiments include a system, comprising: at least one x-ray source, each x-ray source including: an electron source configured to generate an electron beam; and a target configured to receive the electron beam and convert the electron beam into an x-ray beam; and a collimator. A first edge of the collimator closest to the electron source is closer to the electron source than a central axis of the x-ray beam before entering the collimator; and a second edge of the collimator opposite to the first edge is at the central axis of the x-ray beam before entering the collimator or closer to the electron source than the central axis of the x-ray beam before entering the collimator.

19 Claims, 7 Drawing Sheets

Related U.S. Application Data

(60) Provisional application No. 63/133,036, filed on Dec. 31, 2020.

(52) U.S. Cl.
CPC ... *H01J 2235/068* (2013.01); *H01J 2235/086* (2013.01)

(56) References Cited

U.S. PATENT DOCUMENTS

| | | | | |
|---|---|---|---|---|
| 4,287,420 | A * | 9/1981 | Yamamura | A61B 6/4028 378/124 |
| 4,685,118 | A | 8/1987 | Furbee et al. | |
| 4,811,375 | A * | 3/1989 | Klostermann | H01J 35/1024 378/131 |
| 5,844,963 | A * | 12/1998 | Koller | H01J 35/153 378/138 |
| 6,094,469 | A | 7/2000 | Dobbs et al. | |
| 7,280,637 | B1 | 10/2007 | Chen et al. | |
| 7,751,528 | B2 * | 7/2010 | Zhou | G06T 11/006 378/21 |
| 9,934,930 | B2 | 4/2018 | Parker et al. | |
| 10,825,634 | B2 | 11/2020 | Hansen et al. | |
| 10,825,636 | B2 | 11/2020 | Hu | |
| 2003/0021380 | A1 * | 1/2003 | Brendler | H01J 35/045 378/154 |
| 2006/0049359 | A1 * | 3/2006 | Busta | C08K 3/04 250/370.09 |
| 2006/0182233 | A1 | 8/2006 | Nakazawa et al. | |
| 2010/0098218 | A1 | 4/2010 | Vermilyea et al. | |
| 2010/0239146 | A1 * | 9/2010 | Suzuki | G06T 11/005 378/4 |
| 2010/0266097 | A1 | 10/2010 | Okunuki et al. | |
| 2011/0058645 | A1 * | 3/2011 | Heuscher | A61B 6/035 378/16 |
| 2011/0080992 | A1 | 4/2011 | Dafni | |
| 2012/0170714 | A1 | 7/2012 | Oreper et al. | |
| 2012/0195403 | A1 | 8/2012 | Vedantham et al. | |
| 2014/0241492 | A1 | 8/2014 | Tamura et al. | |
| 2015/0362442 | A1 | 12/2015 | Morton | |
| 2016/0079029 | A1 | 3/2016 | Li et al. | |
| 2016/0268094 | A1 | 9/2016 | Yun et al. | |
| 2016/0358739 | A1 * | 12/2016 | M. | H01J 35/066 |
| 2017/0148607 | A1 | 5/2017 | Wang et al. | |
| 2018/0211809 | A1 | 7/2018 | Burke et al. | |
| 2018/0211810 | A1 | 7/2018 | Sullivan et al. | |
| 2020/0000423 | A1 | 1/2020 | Mohammadi | |
| 2020/0035440 | A1 * | 1/2020 | Yun | H01J 35/147 |
| 2020/0170097 | A1 | 5/2020 | Tan et al. | |
| 2020/0185184 | A1 | 6/2020 | Ito | |
| 2020/0305809 | A1 | 10/2020 | Schwoebel et al. | |
| 2020/0312601 | A1 | 10/2020 | Jafari et al. | |
| 2023/0411106 | A1 * | 12/2023 | Zhang | H01J 35/153 |

FOREIGN PATENT DOCUMENTS

| | | | |
|---|---|---|---|
| JP | 2013504365 | A | 2/2013 |
| JP | 2014161531 | A | 9/2014 |
| JP | 2018537820 | A | 12/2018 |
| JP | 2020507380 | A | 3/2020 |
| JP | 2020533767 | A | 11/2020 |
| WO | 2018/141485 | | 8/2018 |

OTHER PUBLICATIONS

Bressel, DE 10237546 A1 and its English translation (Year: 2004).*
Int'l Appl. No. PCT/US2021/065845, International Search Report dated Jul. 7, 2022.
Int'l Appl. No. PCT/US2021/065845, Written Opinion dated Jul. 7, 2022.
EP21157470.2, Examination Search Report and Provisional Opinion dated Jul. 27, 2021 (13 pages).
U.S. Appl. No. 17/177,038, Office Action dated Dec. 16, 2022.
U.S. Appl. No. 17/177,038, Response to Office Action dated Apr. 17, 2023.
U.S. Appl. No. 17/177,038, Final Office Action dated May 25, 2023.
U.S. Appl. No. 17/177,038, Response to Office Action dated Nov. 22, 2023.
U.S. Appl. No. 17/177,038, Notice of Allowance dated Dec. 7, 2023.
U.S. Appl. No. 17/177,038, Notice of Allowance dated Mar. 20, 2024.
Zhang et al., Stationary Scanning X-ray Source Based on Carbon Nanotube Field Emitters, Applied Physics Letters, vol. 86, No. 18, 184104.1-18104.3 (2005).
EP 21157470.2, Search Report dated Sep. 29, 2021 (18 pages).

* cited by examiner

HYBRID MULTI-SOURCE X-RAY SOURCE AND IMAGING SYSTEM

Stationary tomosynthesis may be performed using a multi-source x-ray tube. Such a multi-source x-ray tube may include multiple emitters, such as nanotube emitters. While tomosynthesis may be performed using a multi-source x-ray tube, the dose may be insufficient to perform certain higher dose two-dimensional (2D) imaging.

DETAILED DESCRIPTION

Some embodiments relate to x-ray sources with multiple x-ray fluxes (representing different doses). Embodiments described herein may allow for tomosynthesis used in lower dose three-dimensional (3D) imaging (e.g., "3D" mammography) and either or both of higher dose two-dimensional (2D) imaging and magnification imaging. Different electron emitters—anode configurations may be used in an x-ray source with different x-ray fluxes appropriate for the different applications.

Figure 1:
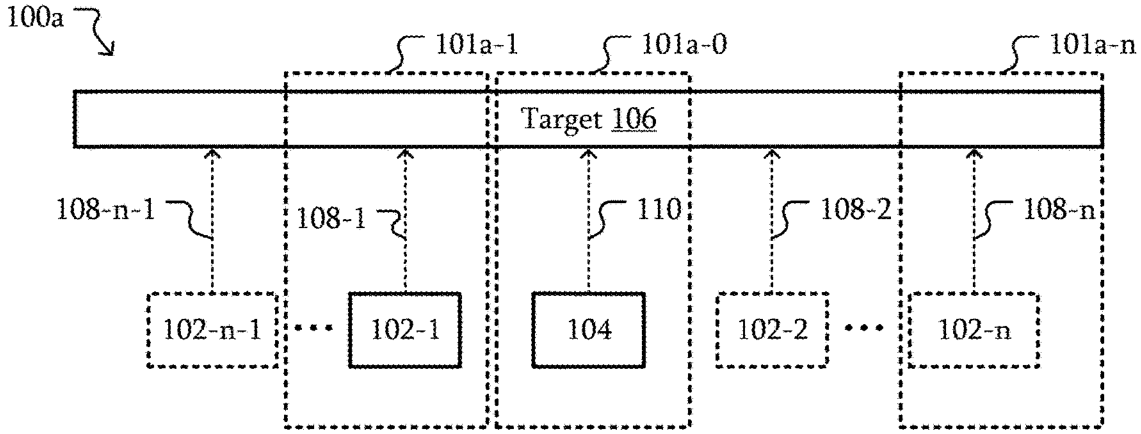
FIG. 1 is a block diagram of a system with multiple x-ray sources according to some embodiments.

FIG. 1 is a block diagram of a system with multiple x-ray sources according to some embodiments. The system 100*a* includes multiple x-ray sources 101*a* including emitters 102 and 104 and a target 106. The system 100*a* may include other components, electronics, vacuum enclosures, or the like; however, those are not illustrated for clarity.

The emitters 102 and 104 may be any variety of emitters. For example, each of the emitters 102 and 104 may include a filament (e.g., coil filament emitter), a low work function (LWF) emitter, a field emitter, a dispenser cathode, a photo emitter, or the like. The emitters 102 and 104 may be the same or different types of emitters. For example, emitters 102 may be field emitters used in tomosynthesis while emitter 104 may be a filament used in 2D and/or magnification imaging.

The target 106 is a structure configured to generate x-rays in response to incident electron beams such as electron beams 108 and 110. The target 106 may include materials such as tungsten (W), molybdenum (Mo), rhodium (Rh), silver (Ag), rhenium (Re), palladium (Pd), or the like. In some embodiments, the target 106 is a linear target where the target length is 2 times, 5 times, 10 times, 20, or 50 times the target width (or height) with a length:width (or length: height) aspect ratio. In some embodiments, the linear target may be flat or in a curve, such as a continuous curve, a piecewise-linear curve, a combination of such curves, or the like. In some embodiments, the electron beams 108 and 110 from each of the emitters 102 and 104 may strike a different sections or portions of the target 106. In some embodiments, the electron beams 108 and 110 from the emitters 102 and 104 may strike at least three, five, or ten different sections or portions of the target 106.

In some embodiment, the x-rays emitted from the x-ray sources 101 may be directed towards a common location. For example, the x-ray source 101 may be oriented in a housing, gantry, or other structure such that the x-rays are directed towards a single point or region. When the system 100*a* is installed the point or region may be a location where an object, specimen, patient, or the like is placed. In some embodiments, the system may be mounted on a stationary structure or gantry. The placement and orientation of the x-ray source 101 may alleviate a need to rotate the system around an object, specimen, patient, or the like.

The combination of an emitter 102 or 104 and the target 106 forms an x-ray source 101*a*. For example, x-ray source 101*a*-0 includes emitter 104 and the target 106. X-ray sources 101*a*-1 to 101*a*-*n* each includes the corresponding emitter 102-1 to 102-*n* and the target 106. While a single target 106 has been illustrated as an example, as will be described in further detail below, each x-ray source 101 may include a different region of the target 106 or separate targets 106. As will be described in further detail below, the x-ray sources 101 may have other aspects such as different configurations of emitters 102 or 104, different targets 106 and/or regions of targets 106, or the like such that at least one of the x-ray sources 101 is different from another one of the x-ray sources 101. Here, x-ray source 101*a*-0 is different from the x-ray sources 101*a*-1 to 101*a*-*n* in that the emitters 102 are different from the emitter 104. In some embodiments, the emitters 102 may be identical. Thus, only one of the x-ray sources 101*a*, namely, the x-ray source 101*a*-0, is different from the others. However, in some embodiments, each of the x-ray sources 101 may be different. In other embodiments, different combinations of the emitters 102 and 104 may be the same while others are different.

While the emitters 102 and 104 may be similar, emitters 102 and 104 are configured such that a maximum current of a first electron beam 108 from one of the emitters 102 on a first focal spot on the target 106 is different from a second maximum current of a second electron beam 110 on a second focal spot on the target 106.

The maximum current is the maximum current achievable by the individual emitter 102 or 104 and the configuration of the corresponding portion of the target 106. While in some embodiments, the emitters 102 and 104 may be operated to have the same operating current, the emitters 102 and 104 and/or the target 106 are configured such that the maximum current achievable by the emitter 104 and target 106 can also be different. For example, one or more of the emitters 102 may have a maximum current that is not achievable with the configuration of the emitter 104 or the emitter 104 may have a maximum current that is not achievable by one or more of the emitters 102.

In some embodiments, the system 100*a* includes at least one emitter 102 and a single emitter 104. As will be described in further detail below, the emitters 102 and 104 may have some similarities; however, in operation and in combination with the corresponding focal spot and portion of the target 106, the emitter-target combination has a maximum current.

In some embodiments, the maximum current due to the emitter 104 and the corresponding portion of the target 106 is greater than the maximum current of a single emitter 102, such as emitter 102-1, and the corresponding portion of the target 106. In other embodiments, the relative maximum currents are reversed, so maximum currents of emitter 102 is greater than emitter 104. The maximum currents may be related by a factor of 1.5, 2, 10, 100, or more.

In some embodiments, the maximum current of the electron beam 110 may be greater or less than the maximum current of one of the electron beams 108. Accordingly, even with an identical portion of the target 106, the electron beams 108 may generate a different maximum current on the target 106 than the electron beam 110. For example, a maximum current of the electron beams 108 may be about 30 milliamperes (mA) while a maximum current of the electron beam 110 may be about 100 mA. In an example, the maximum current (e.g., first maximum current) of the electron beam (e.g., 110) from a first electron source (e.g., 101*a*-0) is at least twice (2 times), 3 times, 5 times, 10 times, 20 times, 50 times, or 100 times greater than the maximum current (e.g., second maximum current) of the electron beam (e.g., 108) from a second electron source (e.g., 101*a*-1). For example, the electron beams 108 from emitters 102 may be used in lower dose tomosynthesis while electron beam 110 from emitter 104 may be used in higher dose 2D and/or magnification imaging.

The system 100*a* may include any number of emitters 102, represented by emitters 102-1 to 102-*n* where n is any integer greater than one. In some embodiments, the number of emitters 102 is one or at least two. In some embodiments, the number of emitters 102 may be about 25. In other embodiments, the number may be different, based on a variety of factors such as layout, configuration, application, or the like.

In some embodiments, the emitters 102 and 104 may be disposed in a flat, one dimensional array. In other embodiments, the emitters 102 and 104 may be disposed in a curve, such as a continuous curve, a piecewise-linear curve, a combination of such curves, or the like. In some embodiments, the emitters 102 and 104 may be disposed in a two-dimensional array or a combination of one and two-dimensional arrays. In some embodiments, an arc of the emitters may extend from about +/−15 degrees to about +/−90 degrees around a central point. The target 106 may be shaped in a manner corresponding to the one or two-dimensional array of the emitters 102 and 104.

In some embodiments, the emitter 104 is disposed in a center of the emitters 102. However, in other embodiments, the emitter 104 may be disposed in different locations. For example, the emitter 104 may be disposed at an end of an array of the emitters 104, offset from the center of the emitters 104, or the like.

In some embodiments, the system 100*a* may be used for different applications. For example, in one set of operations, each of the emitters 102 and 104 may be operated to generate substantially the same current on the target 106. Such an application may be used to generate tomographic images. However, in other operations, such as two-dimensional mammography, a two-dimensional projection image may be desired. For such images, a higher x-ray intensity may be desired. As the emitter 104 is configured differently than the emitters 102, the system 100*a* may be used in both types of operations.

Figure 2:
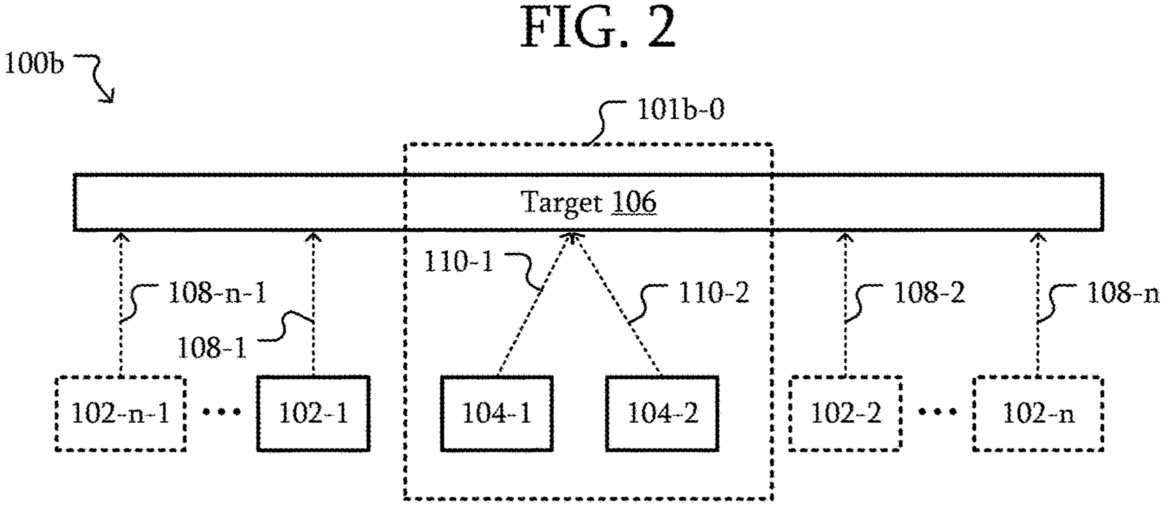
FIG. 2 is a block diagram of a system with multiple x-ray sources according to some other embodiments.

FIG. 2 is a block diagram of a system with multiple emitters according to some other embodiments. The system 100*b* may be similar to the system 100*a* described above. However, in some embodiments, the system 100*b* may include x-ray source 101*b*-0 with multiple emitters 104 (other x-ray sources 101 similar to x-ray sources 101*a*-1 to 101*a*-*n* are not illustrated in this or other figures for clarity). Here, two emitters 104-1 and 104-2 are illustrated; however, in other embodiments, the number may be greater than two. Each emitter 104 may be configured to generate a corresponding electron beam 110. In some embodiments, the electron beams 110 may be focused and/or steered on the same portion of the target 106, such as on the same focal spot on the target 106. The focusing and/or steering of the electron beams 110 on the same portion of the target 106 may be performed by structural (e.g., emitter cavities) and/or electrical (e.g., focusing electrodes) features of the emitters 104 and/or magnetics or electrostatic mechanisms, or the like.

In some embodiments, one of the emitters 104 such as emitter 104-1 may be similar to the emitters 102. However, the emitter 104-2 may be different, such as by being larger or smaller. As a result, the maximum current on the target may be different due to the different emitter 104-2.

In some embodiments, both the emitters 104-1 and 104-2 may be different from the emitters 102. For example, the emitter 104-1 may be smaller and/or configured to generate a smaller focal spot on the target 106 while the emitter 104-1 may be larger and/or configured to generate a larger focal spot on the target. In some operations, the emitter 104-1 with a smaller focal spot may be used for high resolution imaging while the larger emitter 104-2 may be used for two-dimensional imaging such as for mammography.

Figure 3A:
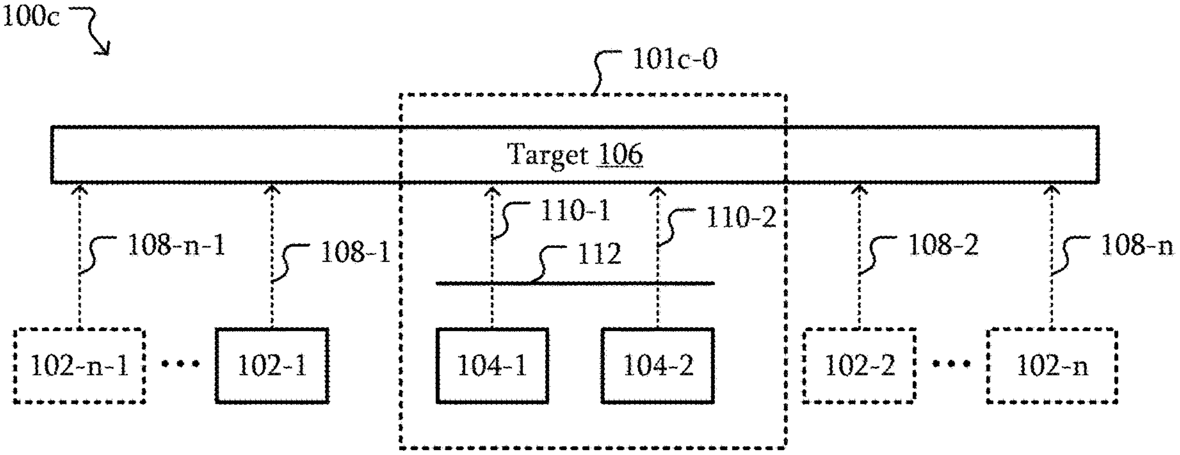
FIGS. 3A-3B are block diagrams of a system with an x-ray source with multiple emitters according to some other embodiments.
Figure 3B:
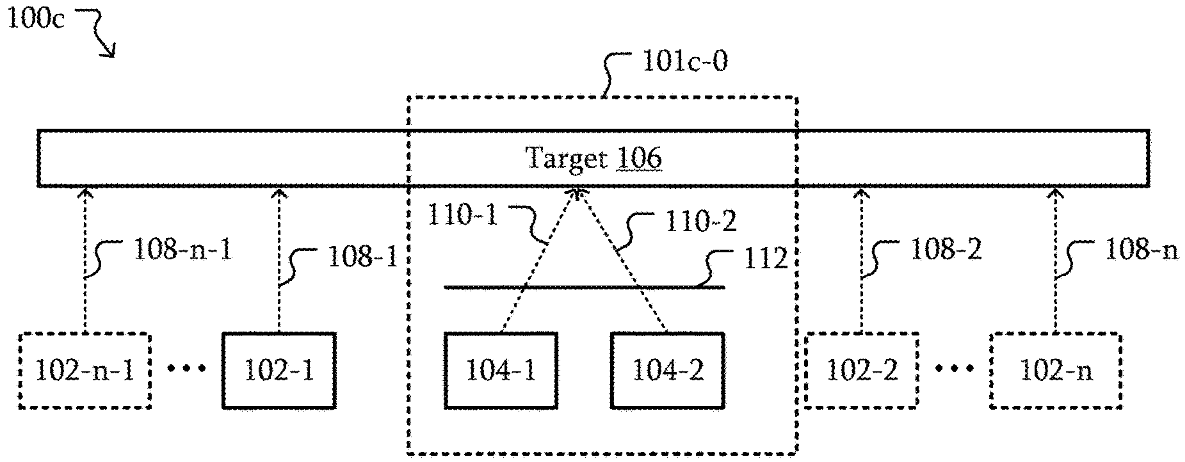

FIGS. 3A-3B are block diagrams of a system with an x-ray source with multiple emitters according to some other embodiments. In some embodiments, the system 100*c* may be similar to the system 100*b* described above. However, the emitters 104 of x-ray source 101*c*-0 may include one or more focusing electrodes 112 configured to focus the electron beams 110 on different focal spots on the target 106. In some operations, the focusing electrodes 112 may be controlled to focus each of the electron beams 110 on a different focal spot on the target 106 as illustrated in FIG. 3A.

However, in other operations, the focusing electrodes 112 may be controlled to focus the electron beams 110 on a single focal spot as illustrated in FIG. 3B. As a result, the effective maximum current on that focal spot will be higher than that of a single emitter 104. Although two emitters 104 have been used as an example, in other embodiments, more emitters 104 may be used. In some embodiments, a sufficient number of emitters 104 may be grouped together to achieve a desired aggregate current. For example, the emitters 104 may be disposed in a two-dimensional array.

While some embodiments have been described where the focusing electrodes 112 may be controlled to focus the electron beams 110 on a single focal spot or multiple focal spots on the target 106, in other embodiments, the focusing may be fixed. For example, the focusing may be set to focus the electron beams 110 on the single focal spot. In operation, any number of the emitters 104 from zero to all emitters 104 may be controlled, such as by focusing electrodes 112 (which combination can be referred to as a grid) or other component specific to the type of the emitter 104, to selectively emit the electron beams 110. As a result, the effective current on the single focal spot may be controlled by controlling which emitters 104 emit electron beams 110 towards the single focal spot.

Figure 4:
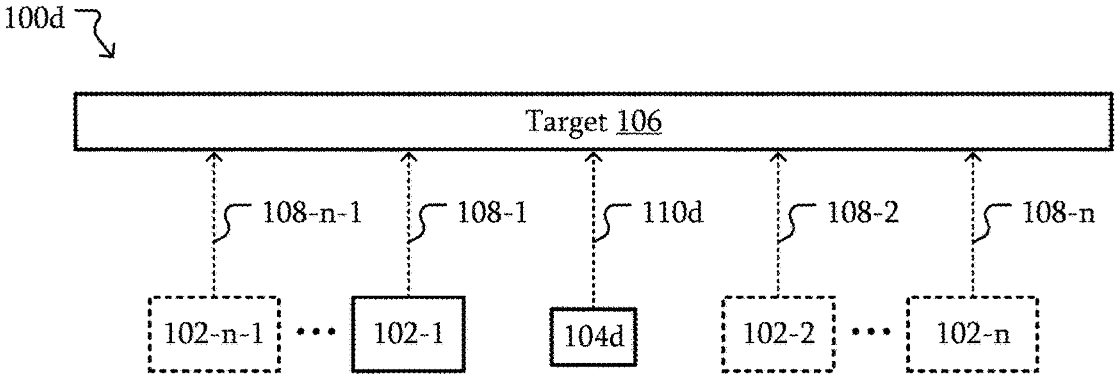
FIG. 4 is a block diagram of a system with an x-ray source including a smaller emitter according to some embodiments.

FIG. 4 is a block diagram of a system with an x-ray source including a smaller emitter according to some embodiments. The system 100*d* may be similar to the system 100*a* described above. However, in some embodiments, the emitter 104*d* may be smaller than the emitters 102. The emitter 104*d* may be configured to provide an electron beam 110*d* having a lower maximum current. In some embodiments, the electron beam 110*d* may have a smaller focal spot size. The smaller focal spot size may allow for greater resolution than the other electron beams 108. As a result, the electron beam 110*d* and the resulting x-ray beam may be used for high resolution imaging.

Figure 5:
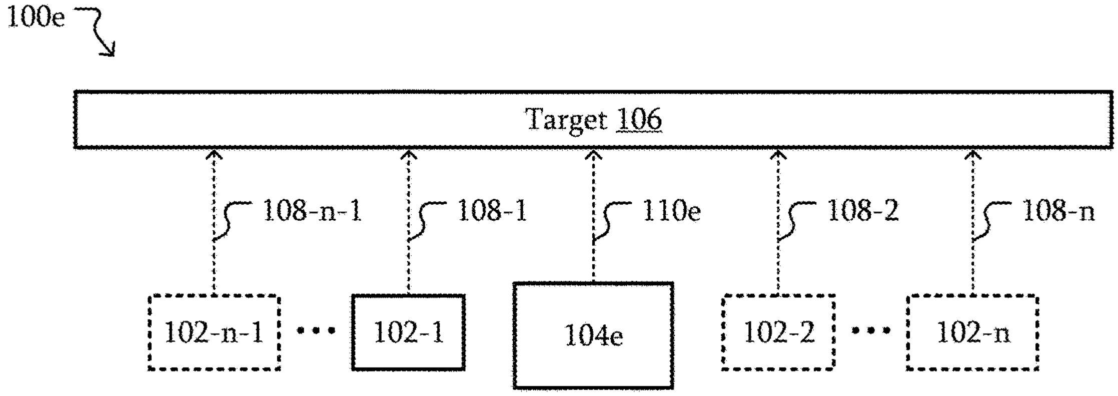
FIG. 5 is a block diagram of a system with an x-ray source including a larger emitter according to some embodiments.

FIG. 5 is a block diagram of a system with an x-ray source including a larger emitter according to some embodiments. The system 100*e* may be similar to the system 100*a* described above. However, in some embodiments, the maximum current of the emitter 104*e* may be greater than those of the emitters 102. As a result, the larger current may allow for two-dimensional imaging, such as two-dimensional mammography.

Many variations of emitter configurations have been described above that result in different maximum current on the target 106. As will be described in further detail below, the target 106 may include different configurations for different portions of the target 106 to achieve the different maximum current. While embodiments will be described where the emitters 102 and 104 have electron beams 108 and 110 with the same or similar current, in other embodiments, the different maximum current may be configurations and target achieved through various configurations.

Figure 6A:
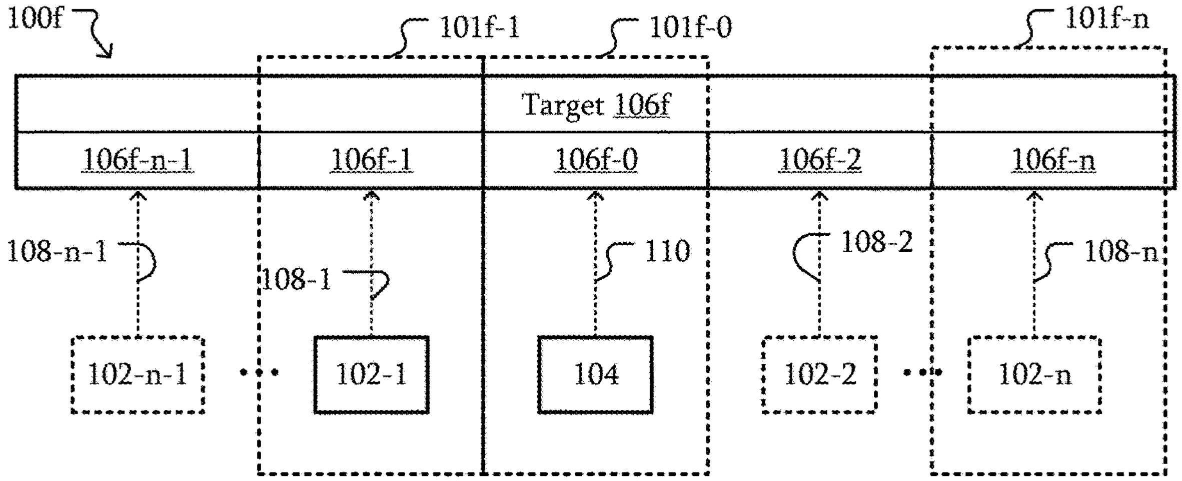
FIG. 6A is a block diagram of a system with x-ray sources with a target with multiple regions according to some embodiments.

FIG. 6A is a block diagram of a system with x-ray sources with a target with multiple regions according to some embodiments. The system 100*f* may be similar to the system 100*a* described above. However, in some embodiments, the emitter 104 of x-ray source 101*f*-0 may be similar to the emitters 102 of x-ray source 101*f*-1. Each emitter 102 and emitter 104 is configured to emit the corresponding electron beam 108 or 110 towards a different region of the target 106, identified here as regions 106*f*-0 to 106*f*-*n*. The regions 106*f*-0 to 106*f*-*n* are part of the x-ray sources 101*f*-0 to 101*f*-*n*. Here, the emitters 102-1 to 102-*n* are configured to emit electron beams 108-1 to 108-*n* towards corresponding regions 106*f*-1 to 106*f*-*n* and emitter 104 is configured to emit the electron beam 110 towards region 106*f*-0.

While the regions 106*f*-0 to 106*f*-*n* are illustrated as adjacent, in some embodiments, the spacing between regions may be different. In addition, in some embodiments, focal spots created by the electron beams 108 or 110 may be separated rather than overlapping.

Figure 6B:
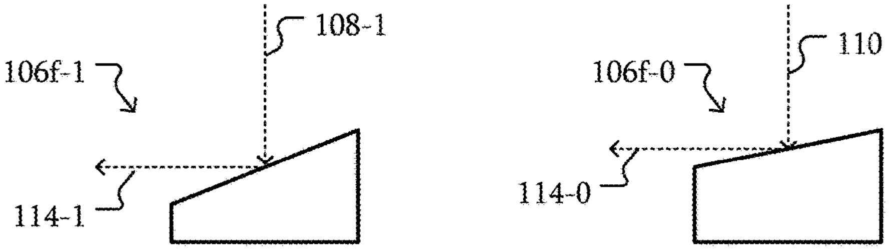
FIG. 6B is a block diagram of regions of a target with different slopes according to some embodiments.

FIG. 6B is a block diagram of regions of a target with different slopes according to some embodiments. Referring to FIGS. 6A and 6B, in some embodiments, the region 106*f*-0 may have a slope different from another region such as region 106*f*-1. In this example, region 106*f*-0 has a shallower slope than region 106*f*-1. As a result, an effective current density on the target in region 106*f*-0 is less than in region 106*f*-1 with the same current in the corresponding electron beams 108-1 and 110. In some embodiments, the current in electron beam 110 from the emitter 104 may be relatively large compared to electron beam 108-1. The larger current may be due to a larger size of the emitter 104. The electron beam 110 may have a larger focal spot on the region 106*f*-0 of the target 106 relative to region 106*f*-1. However, as the slope of region 106*f*-0 is smaller than the slope of region 106*f*-1, the focal spot size of the x-ray beam 114-0 may be smaller than focal spot size of the x-ray beam 114-1. As a result, in some embodiments, a higher current may be used to generate the x-ray beam 114-0 while maintaining a similar x-ray focal spot size as x-ray beam 114-1. In addition, the higher current in the electron beam 110 may be spread over a larger area in the region 106*f*-0 of the target 106. As a result, in some embodiments, the current on the region 106*f*-0 may be the spread over a larger area, resulting in a current density on the region 106*f*-0 that is less than if the larger current was focused on a smaller focal spot. The lower current density on the region 106*f*-0 may increase stability of the target 106, for example, by reducing the temperature of the target 106, the heat flux, or the like. In some embodiments, the configurations of the regions 106*f*-1 to 106*f*-*n* may be similar while the configuration of region 106*f*-0 is different from the configuration of each of the regions 106*f*-1 to 106*f*-*n*.

While a shallower slope in region 106*f*-0 has been used as an example, in other embodiments, the configurations may be different. For example, region 106*f*-0 may have a steeper slope relative to the regions 106*f*-1 to 106*f*-*n*.

Referring back to FIG. 6A, in some embodiments, the regions 106*f*-0 may include a material different from those of regions 106*f*-1 to 106*f*-*n*. As described above, a variety of different materials may be used as a target 106 or a variety of different materials could be used to support the target that are suited for more efficient heat transfer such as copper (Cu) for example. Any of those materials may be used to create the difference in the materials among the regions 106*f*.

In a particular example, the region 106*f*-0 may be formed of tungsten (W). The regions 106*f*-1 to 106*f*-*n* may be formed from a tungsten-rhodium alloy. As described above, in some embodiments, the maximum current of the beam 110 on the region 106*f*-0 may be greater than the other regions 106*f*-1 to 106*f*-*n*. Accordingly, a material, such as tungsten, having a higher thermal performance, such as having a higher melting point, may be used in that region 106*f*-0. However, rhodium (Rh) may have a more desirable x-ray spectrum for particular applications, such as mammography. Accordingly, rhodium may be used as part of the regions 106*f*-1 to 106*f*-*n* that will not receive electron beams 108 with the higher maximum current. Accordingly, in some embodiment, the materials may be selected based on the thermal performance and/or the x-ray emission spectrum.

Figure 7:
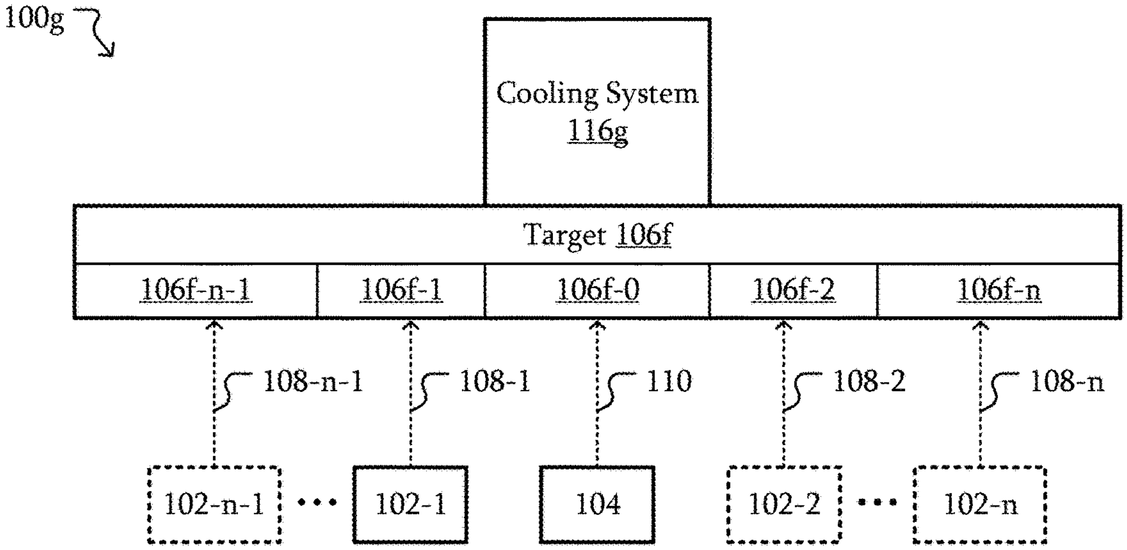
FIG. 7 is a block diagram of a system with x-ray sources with a target with multiple regions with different cooling systems according to some embodiments.

FIG. 7 is a block diagram of a system with x-ray sources with a target with multiple regions with different cooling systems according to some embodiments. The system 100*g* may be similar to the system 100*f* described above. However, the system 100*g* may include a cooling system 116*g* proximate to the region 106*f*-1 and configured to cool at least that region 106*f*-0. For example, the cooling system 1006 may include a fluid cooling system, such as a water-cooled system, an evaporative cooling system, a phase change material, or the like. In some embodiments, other portions of the target 106 may be cooled. However, as the region 106*f*-0 may generate more heat due a higher maximum current, additional cooling may be provided to that region 106*f*-0.

In some embodiments, the regions 106*f* may be spaced apart from each other. For example, the spacing between the regions 106*f* may be a fraction for the length of the region

106*f*, such as about 5%, 10%, or more. In some embodiments, the spacing between the regions 106*f* may be the same or different. In some embodiments, the spacing between region 106*f*-0 and other regions 106*f* may be different than the spacing between those other regions 106*f*.

In some embodiments, the ability of two different configurations in one system 100, such as x-ray sources 100*a*-100*g* may result in a reduced cost. Regardless of whether the desired operation is a higher or lower maximum current, the combination into a single system 100 may reduce complexity, include more uniform parts, reduce cost, or the like. In addition, the combination may allow for additional uses while maintaining previous uses of other x-rays sources. For example, users that were used to using a particular x-ray source for two-dimensional imaging may continue to use that operation while obtaining the additional benefits described above, such as tomographic imaging, improved image quality from reduced motion blur, higher resolution imaging, or the like.

Figure 8:
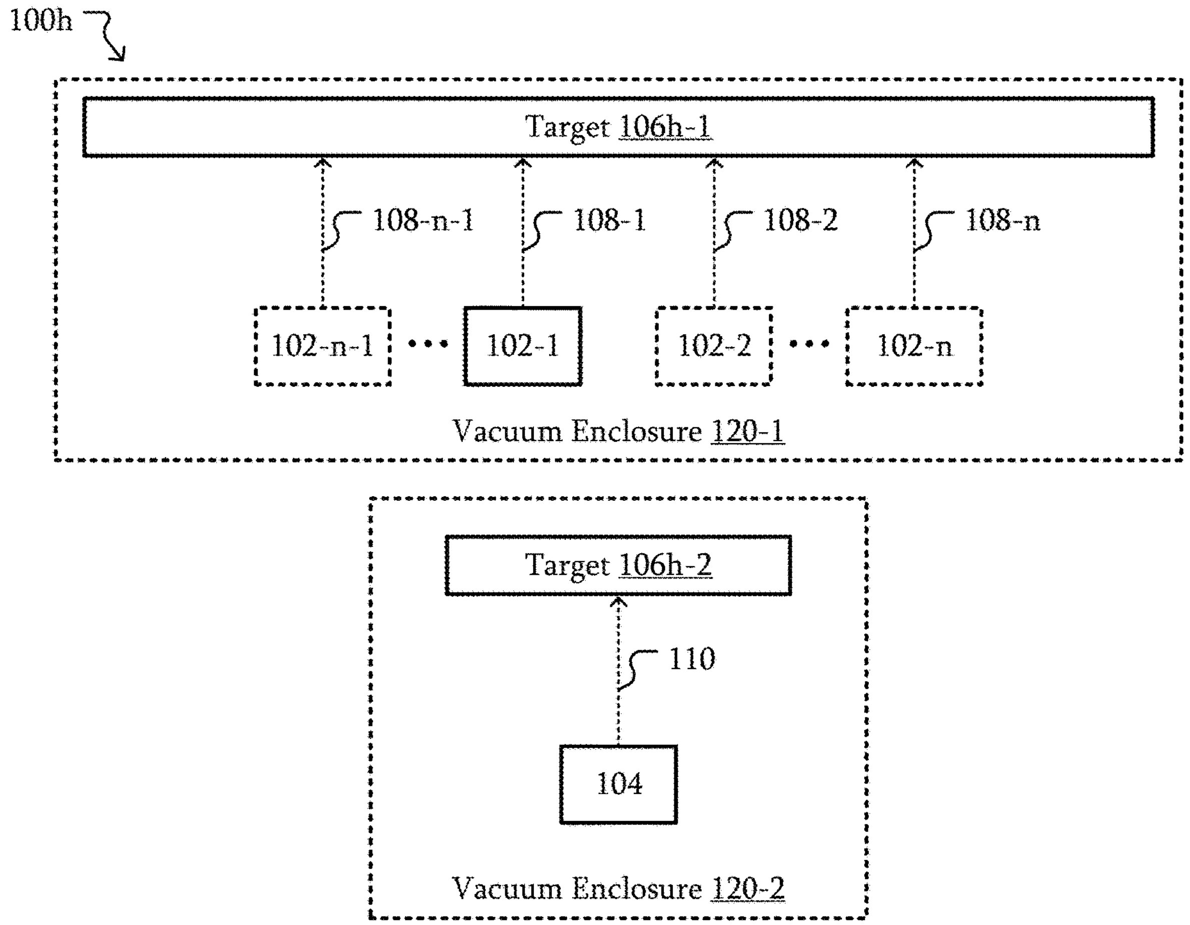
FIG. 8 is a block diagram of a system with x-ray sources with multiple vacuum enclosures according to some embodiments.

FIG. 8 is a block diagram of a system with x-ray sources with multiple vacuum enclosures according to some embodiments. In some embodiments, the system 100*h* may be similar to the system 100*a* described above. However, the emitter 104 may be in a different vacuum enclosure 120. Here, emitters 102 are disposed in the vacuum enclosure 120-1 with the corresponding target 106*h*-1. However, emitter 104 is disposed in the vacuum enclosure 120-2 with the corresponding target 106*h*-2. The vacuum enclosure 120-1 may be adjacent to the vacuum enclosure 120-2 and disposed such that the resulting x-rays are directed towards substantially the same location. Having the emitter 104 in a vacuum enclosure 120-2 different from the vacuum enclosure 120-1 with emitters 102 allows a portion of the system 100*h* that fails and/or wears out to be replace without replacing the entire the system 100*h*, which may provide a cost savings.

In some embodiments, a first x-ray source strikes a different target or region of the target than the second x-ray source. The first x-rays source may share the same control electronics, power supply, or the like.

In some embodiments, the targets described above are part of a stationary anode. In some embodiments the targets described above are part of a linear anode.

Figure 9:
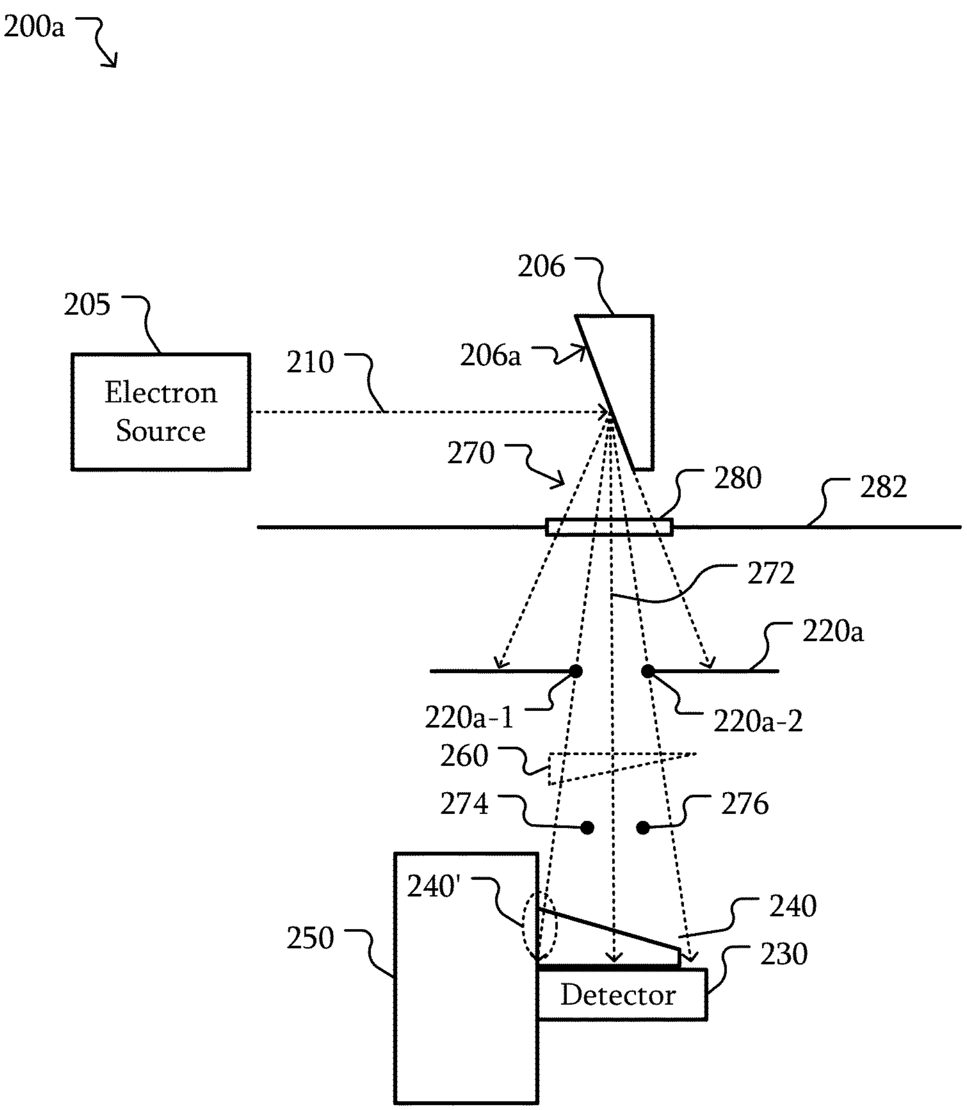
FIG. 9 is a block diagram of an imaging system according to some embodiments.

FIG. 9 is a block diagram of an imaging system according to some embodiments. In some embodiments, the imaging system 200*a* includes an electron source 205 configured to generate an electron beam 210. The electron beam 210 is directed towards a target 206. The target 206 has a surface 206*a* disposed at an angle different from perpendicular relative to the incoming electron beam 210. In some embodiments, the target 206 is part of a rotating anode; however, in other embodiments, the target 206 may be part of a stationary anode. The electron beam 210 received by the target 206 generates an x-ray beam 270 that passes through a window 280 of a vacuum enclosure. In some embodiments, the configuration of the electron source 205 and the target 206 may be similar to the x-ray systems 100 described above; however, in other embodiments, the combination may be different. For example, the electron source 205 may include a single emitter.

A collimator 220*a* is configured to shape the x-ray beam 270. The shaped x-ray beam 270 includes a central axis 272, a portion 274 closer to the electron source 205 and a portion 276 further from electron source 205. The central axis 272 is the direction of x-rays in the x-ray beam 270 that are generated at an angle perpendicular to the incoming electron beam 210. The portions 274 and 276 are formed at least in part by the edges 220*a*-1 and 220*a*-2 of the collimator 220*a*. In particular, the edge 220*a*-1 is closer to the electron source 205 than the central axis 272. The edge 220*a*-2 is further from the electron source 205 than the central axis 272. Due to the heel effect in the generation of the x-ray beam 270, the intensity in the portion 274 may be higher and more uniform than the portion 276. In the portion 276, the intensity may fall off faster closer to the edge 220*a*-2 of the collimator 220*a*.

Anode heel effect or heel effect refers to a lower field intensity or x-ray flux in a portion of the x-ray beam 720 closer to the anode in comparison to the cathode or electron source 205 due to lower x-ray emissions from the target material at angles perpendicular or greater to the electron beam. The conversion of the electron beam 210 into x-rays doesn't simply occur at the surface of the target 206 material but also occurs within target 206 material. Because x-rays are produced deeper in the target 206 material, those x-rays also traverse back out of the target 206 material before x-rays can proceed to the detector 230. More target 206 material needs to be traversed at emission angles that are perpendicular to the electron beam 210 (closer to the target 206) than at those more parallel to the electron beam 210 (closer to the cathode or electron source 205). The increase in target 206 material leads to more resorption of the x-rays by the target 206 material resulting in fewer x-rays reaching the field at angles perpendicular to the electron beam 210. By contrast, the x-rays emitted to angles closer to the incident electron beam 210 travel through less target 206 material and fewer are resorbed. The end result is that the field intensity and x-ray flux towards the cathode or electron source 205 is more than that towards the target 206. This nonuniform beam effect or heel effect may have a negative influence on the results of detection in x-ray imaging.

In some embodiments, an x-ray filter 260 may be disposed in the x-ray beam 270. The x-ray filter 260 is illustrated as being downstream from the collimator 220*a*; however, in other embodiments, the x-ray filter 260 may be disposed in other locations. The x-ray filter 260 may include materials such as molybdenum (Mo), rhodium (Rh), silver (Ag) and aluminum (Al), copper (Cu), stainless steel, combinations of such materials, or the like at various thicknesses. The x-ray filter 260 may be configured to adjust the intensity of the x-ray beams 270 such that the portions 274 and 276 are more uniform, thus mitigating the heel effect.

In some embodiments, the imaging system 200*a* is used with a detector 230 to generate an image based on a portion 240 of a patient 250. For example, the portion 240 may be the breast of a patient 250. Due to the positioning of the patient 250 relative to the x-ray beam 270, a portion 240' may not be imaged. However, the remainder may be imaged with an x-ray beam where a variation in the intensity due to the heel effect has a reduced impact (e.g., heel effect applied on narrower portion of the breast with lower mass density). For example, the variation due to the heel effect may range from 80% to 100% with a 15 degree angle of the surface 205*a*. Accordingly, for a given image quality during an operation of the imaging system 200*a*, the patient may receive a reduced dose. In addition, the use of substantially the full field of the x-ray beam 270 may allow for a reduced source-to-image distance (SID), increasing the imaging x-ray dose, allow for a reduced power for the same imaging x-ray dose, or the like.

In some embodiments, a smaller angle may be used on the surface 206*a* of the target 206. For example, a nanotube (NT) emitter with size of w1 (width)×l1 (length) results in an electric focal spot size (FSS) of w2 (width)×l2 (length) on the surface 206*a* after electron beam focusing. The electron FSS on surface 206*a* depends on focusing electrode design where smaller the NT emitter size (w1×l1), the smaller electron FSS on the surface (w2×l2). X-ray FSS of w3 (width)×l3 (length) is determined by electron FSS and the angle (θ) of the surface 206*a*. W3 is equal to w2 and l3 is equal to l2×sin(θ). At a given x-ray FSS, a smaller anode angle allows for a larger electron FSS and a larger emitter. A larger NT emitter can produce larger emission current. A larger electron FSS on the surface 206*a* distributes the heat load in a larger area, which allows for higher tube power and x-ray dose output.

Accordingly, as the impact of the heel effect is reduced, a smaller angle on the surface 206*a* may be used. The smaller angle allows for an increased current or size of the emitters in the electron source 205. For example, a larger size of a field emitter may provide a larger current; however, the larger size would lead to a larger x-ray FSS. However, the angle of the surface 206*a* may be reduced to maintain the x-ray FSS while still increasing the dose at the same or similar SID.

Figure 10:
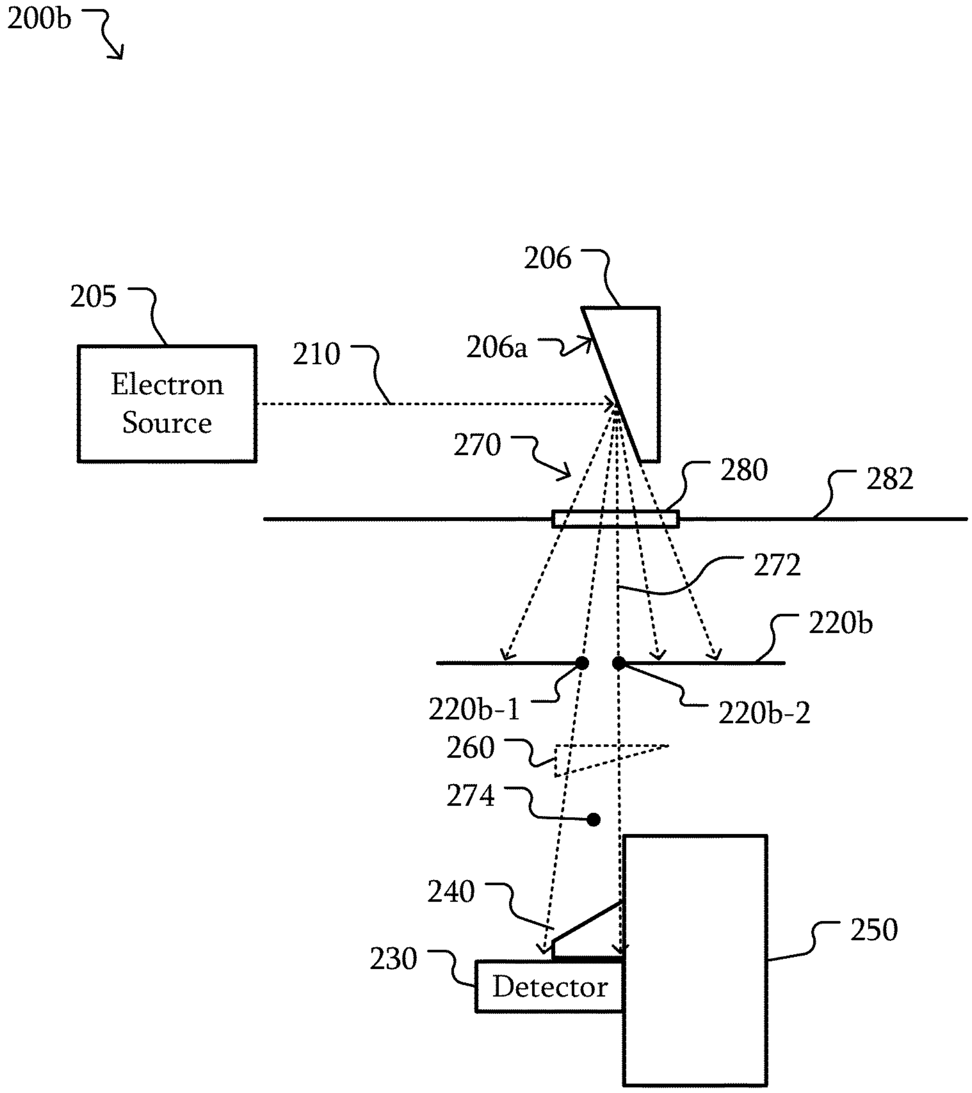
FIG. 10 is a block diagram of an imaging system according to some other embodiments.

FIG. 10 is a block diagram of an imaging system according to some other embodiments. The imaging system 200*b* may be similar to the imaging system 200*a* as described above. However, the imaging system 200*b* includes a collimator 220*b* having a different configuration. The collimator 220*b* includes an edge 220*b*-2 that is substantially aligned with the central axis 272. In other embodiments, the edge 220*b*-2 may be in a different position, such as closer to the electron source 205. As a result of the position of the edges 220*b*-1 and 220*b*-2 of the collimator 220*b*, the portion of the x-ray beam 270 exiting the collimator is substantially only the portion 274 or a subset of the portion 274. The heel effect may have a reduced impact on the portion 274, resulting in an increased uniformity of the x-rays passing through the collimator 220*b*. In some embodiments, an x-ray filter 260 may be omitted as the uniformity of the x-rays in the portion 274 may be sufficient. For example, the x-ray intensity may vary from about 90% to 100% with a 15 degree angle on the target surface 206*a*. In addition, the imaging system 200*b* may have a higher intensity at a distal end of the portion 240.

In some embodiments, the imaging system 200*b* allows for the patient 250 to be on a side of the system 200*b* opposite to that of FIG. 9. In some embodiments, the use of a distributed electron source 205 such as those described above, relative to electron source 205 using a rotating anode, may allow for additional room for the patient 250. The number of external attachments on the patient 250 side of the system 200*b* may be reduced, leaving more room for the patient 250. For example, the high voltage connection, ion pumps, getters, tubulation, or the like may leave more room for the patient 250. In addition, the use of a distributed electron source 205 allows for the flexibility of not using a rotating anode. As a result, bearings, a rotor, a stator, or the like from a rotating anode, may not be present on the side of the patient 250. The patient 250 may be positioned closer to the x-ray beam 270, minimizing an amount the chest wall of the patient 250 is cut out of the image.

Referring to FIGS. 9 and 10, in some embodiments, a collimator 220 may be adjustable. For example, a position of the edge 220*a*-2/200*b*-2 may be adjustable to move the edge from the position in FIG. 9 to the position in FIG. 10. In other embodiments, other aspects of the collimator may be moved. For example, the position, aperture, shape, or the like make be adjusted to achieve the desired opening relative to the central axis 272 and the portions 274 and 276.

Figure 11:
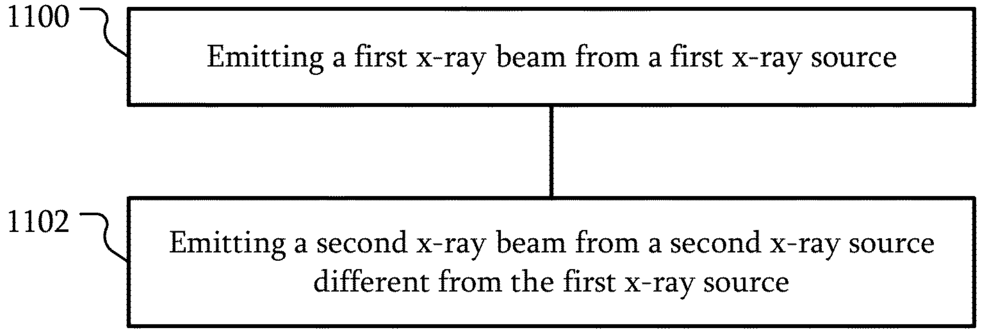
FIG. 11 is a flowchart of a technique of operating a system with multiple x-ray sources according to some embodiments.

FIG. 11 is a flowchart of a technique of operating a system with multiple x-ray sources according to some embodiments. In 1100, a first x-ray beam is emitted from a first x-ray source. In 1102, a second x-ray beam is emitted from a second x-ray source. This technique and variations may be used with the variety of systems described above. For example, referring to FIGS. 1 and 11, emitting the first x-ray beam may be performed by the x-ray source 101*a*-0 and emitting the second x-ray beam may be performed by the x-ray source 101*a*-1. The emission of the x-ray beams may be caused by the emission of electron beams 108 and 110 from the corresponding emitters 102 and 104.

Referring to FIGS. 2 and 11, the emission of one of the x-ray beams may be the result of the focusing of multiple electron beams 110-1 and 110-2 on the target 106. Referring to FIGS. 3A, 3B, and 11, in some embodiments, the focusing may be modified such that the electron beams 110-1 and 110-2 are focused on different regions or the same region of the target 106 to generate the multiple or a single x-ray beam, respectively.

Figure 12:
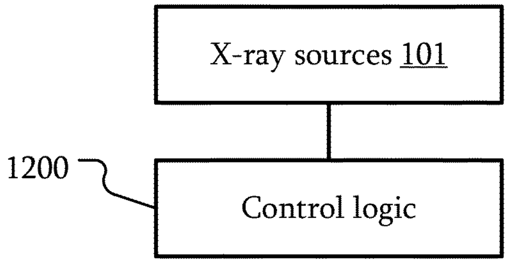
FIG. 12 is a block diagram of a system with multiple x-ray sources according to some embodiments.

FIG. 12 is a block diagram of a system with multiple x-ray sources according to some embodiments. In some embodiments, the x-ray source 101 may be coupled to control logic 1200. The control logic 1200 may include a general purpose processor, a digital signal processor (DSP), an application specific integrated circuit, a microcontroller, a programmable logic device, discrete circuits, a combination of such devices, or the like. The control logic 1200 may include external interfaces, such as address and data bus interfaces, interrupt interfaces, or the like. The control logic 1200 may include other interface devices, such as logic chipsets, hubs, memory controllers, communication interfaces, or the like to connect the control logic 1200 to internal and external components. The control logic 1200 may be configured to control the variety of operations described herein. The control logic 1200 may include connections to the x-ray source 101 including connections to apply voltages and/or supply current to the emitters 102 and 104, focus electrodes 112, target 106, or the like.

In some embodiments, the emission of the x-ray beam may be the result of differently sized emitters emitting electron beams 110 towards a target 106.

Some embodiments include a system, comprising: a plurality of x-ray sources (101), each x-ray source (101) including: an electron source (102, 104) configured to generate an electron beam (108, 110); and a target (106) configured to receive the electron beam (108, 110) and convert the electron beam (108, 110) into an x-ray beam; wherein at first x-ray source (101) of the x-ray sources (101) is different from a second x-ray source (101) of the x-ray sources (101).

In some embodiments, the targets (106) of the x-ray sources (101) are part of a linear target (106).

In some embodiments, an aspect ratio of the linear target (106) is greater than or equal to at least one of 2:1, 10:1, and 20:1.

In some embodiments, the linear target (106) is a flat, curved, or piecewise linear target (106).

In some embodiments, the x-ray sources (101) are disposed such that the corresponding x-ray beams substantially converge on a single point.

In some embodiments, a first plurality of the x-ray sources (101) include at least one field emitter; and another x-ray source (101) of the x-ray sources (101) includes a filament, a low work function emitter, a dispenser cathode, or a photo emitter.

In some embodiments, the system further comprises a collimator (220) configured to collimate the x-ray beam from each of the x-ray sources (101).

In some embodiments, the first x-ray source (101) of the x-ray sources (101) includes a first electron source (102, 104) including at least one emitter; the second x-ray source (101) of the x-ray sources (101) includes a second electron source (102, 104) including at least one emitter; and wherein: the first electron source (102, 104) and the second electron source (102, 104) are configured such that a first maximum current of a first electron beam (108, 110) from one of the emitters of the first electron source (102, 104) on a first focal spot on the corresponding target (106) is different from a second maximum current of a second electron beam (108, 110) from the second electron source (102, 104) on a second focal spot on the corresponding target (106).

In some embodiments, the first maximum current is greater than the second maximum current.

In some embodiments, the first maximum current is greater than the second maximum current by a factor of at least one of 2, 10, and 100.

In some embodiments, at least some of the x-ray sources (101) are substantially the same.

In some embodiments, at least three of the x-ray sources (101) are substantially the same.

In some embodiments, the first x-ray source (101) comprises a first emitter and a second emitter; and the first emitter is configured to generate a maximum current higher than a maximum current of the second emitter.

In some embodiments, the first x-ray source (101) comprises: a plurality of emitters; and a plurality of focus electrodes (112) configured to focus electron beams (108, 110) from the emitters on a single focal spot.

In some embodiments, the first x-ray source (101) comprises: a plurality of emitters; and a plurality of focus electrodes (112) configured to controllably focus electron beams (108, 110) from the emitters on a single focal spot and controllably focus the electron beams (108, 110) from the emitters on multiple focal spots.

In some embodiments, the system further comprises a first vacuum enclosure (120, 282) including the at first x-ray source (101); a second vacuum enclosure (120, 282) separate from the first vacuum enclosure (120, 282) including the second x-ray source (101).

In some embodiments, for at least one of the x-ray sources (101): a surface of the target (106) is disposed at an angle relative to the associated electron beam (108, 110) that is different from perpendicular; and a first edge of the collimator (220) closest to the electron source (102, 104) is closer to the electron source (102, 104) than a central axis (272) of the x-ray beam before entering the collimator (220).

In some embodiments, a second edge of the collimator (220) opposite to the first edge is at or closer to the electron source (102, 104) than the central axis (272) of the x-ray beam before entering the collimator (220).

In some embodiments, a position of the collimator (220) relative to the x-ray beam is adjustable.

In some embodiments, the target (106) of the first x-ray source (101) has a configuration different from the target (106) of the second x-ray source (101).

In some embodiments, the target (106) of the first x-ray source (101) has a slope different from the target (106) of the second x-ray source (101).

In some embodiments, the target (106) of the first x-ray source (101) has a material different from a material of the target (106) of the second x-ray source (101).

In some embodiments, the system further comprises a cooling system configured to cool the target (106) of the first x-ray source (101) differently from the target (106) of the second x-ray source (101).

Some embodiments include a method, comprising: emitting a first x-ray beam from a first x-ray source (101) including at least part of a target (106); and emitting a second x-ray beam from a second x-ray source (101) including at least part of the target (106); wherein the first x-ray source (101) is different from the second x-ray source (101).

In some embodiments the target is a linear target.

In some embodiments, emitting the first x-ray beam comprises emitting the first x-ray beam through a collimator (220); and emitting the second x-ray beam comprises emitting the second x-ray beam through the collimator (220).

In some embodiments, emitting the first x-ray beam comprises emitting a first electron beam (108, 110) from a first electron source (102, 104) including multiple emitters towards a target (106); and emitting the second x-ray beam comprises emitting a second electron beam (108, 110) from a second electron source (102, 104) including at least one emitter towards the target (106); wherein a first maximum current of the first electron beam (108, 110) on a first focal spot on the target (106) is different from a second maximum current of a second electron beam (108, 110) on a second focal spot on the target (106).

In some embodiments, the at least one emitter of the second electron source (102, 104) comprises a first emitter and a second emitter; and further comprising: emitting the second electron beam (108, 110) from the first emitter of the second electron source (102, 104) with a first current during a first operation; and emitting the second electron beam (108, 110) from the second emitter of the second electron source (102, 104) with a second current greater than the first current density during a second operation.

In some embodiments, the first operation is a three-dimensional imaging operation; and the second operation is a two-dimensional imaging operation.

In some embodiments, the at least one emitter of the second electron source (102, 104) comprises a plurality of emitters; and further comprising focusing electron beams (108, 110) from the emitters of the second electron source (102, 104) on the second focal spot.

In some embodiments, the first maximum current is less than the second maximum current.

In some embodiments, collimating an x-ray beam generated in response to the second electron beam (108, 110) with a collimator (220) such that at least part of the x-ray beam between an edge of the collimator (220) and a central axis (272) of the x-ray beam that is closer to the second electron source (102, 104) is passed by the collimator (220).

Some embodiments include a system, comprising: a plurality of means for emitting electron beams; and means for generating x-rays in response to the electron beams; wherein a first combination of a first means for emitting electron beams and the means for generating x-rays in response to the electron beams is different from a second combination of a second means for emitting electron beams and the means for generating x-rays in response to the electron beams. Examples of the means for emitting electron beams include the emitters 102 and 104 (also referred to as electron sources), or the like. Examples of the means for generating x-rays in response to the electron beams include the target 106 or the like.

In some embodiments, a first maximum current on the means for generating x-rays of a first electron beam from one of the means for emitting electron beams is different from a second maximum current of a second electron beam from another one of means for emitting electron beams.

In some embodiments, the system further comprises means for collimating the x-ray beam. Examples of the means for collimating the x-ray beam include the collimator 220.

Some embodiments include a system, comprising: an electron source (102, 104) including multiple emitters; a target (106); wherein: the emitters of the electron source (102, 104) are configured to emit electrons towards a plurality of focal spots on separate regions of the target (106); at least one of the separate regions of the target (106) has a configuration different from at least one other region of the separate regions.

Some embodiments include a system, comprising: a first electron source (102, 104) including at least one emitter; a second electron source (102, 104) including at least one emitter; and a target (106); wherein: each of the emitters of the first electron source (102, 104) and the second electron source (102, 104) are configured to emit electrons towards the target (106); and the first electron source (102, 104) and the second electron source (102, 104) are configured such that a first maximum current of a first electron beam (108, 110) from one of the emitters of the first electron source (102, 104) on a first focal spot on the target (106) is different from a second maximum current of a second electron beam (108, 110) from the second electron source (102, 104) on a second focal spot on the target (106).

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112 (f). Embodiments of the invention in which an exclusive property or privilege is claimed are defined as follows.

The invention claimed is:

1. A system, comprising:
- a plurality of x-ray sources comprising:
  - a first electron source configured to generate a first electron beam;
  - a second electron source configured to generate a second electron beam; and
  - a target configured to:
    - receive the first electron beam and convert the first electron beam into a first x-ray beam; and
    - receive the second electron beam and convert the second electron beam into a second x-ray beam;
- a collimator;
- a filter downstream of the collimator; and
- a first focusing electrode;
- wherein:
  - a surface of the target is disposed at an angle relative to the first electron beam that is different from perpendicular;
  - a first edge of the collimator closest to the first electron source is closer to the first electron source than a central axis of the first x-ray beam before entering the collimator;
  - a second edge of the collimator opposite to the first edge is at the central axis of the first x-ray beam before entering the collimator or closer to the first electron source than the central axis of the first x-ray beam before entering the collimator;
  - a first edge of the filter closest to the first electron source has a first thickness;
  - a second edge of the filter opposite the first edge of the filter has a second thickness less than the first thickness;
  - the first electron source is configured to direct the first electron beam through the first focusing electrode; and
  - the second electron source is configured to direct the second electron beam to the target without passing through a focusing electrode.

2. The system of claim 1, wherein:
- a first x-ray source of the plurality of x-ray sources is different from a second x-ray source of the plurality of x-ray sources; and
- the target is a linear target.

3. The system of claim 1, wherein the filter comprises at least one of molybdenum (Mo), rhodium (Rh), silver (Ag), aluminum (Al), copper (Cu), or stainless steel.

4. The system of claim 1, wherein:
- a first x-ray source of the plurality of x-ray sources operates at a first maximum current; and
- a second x-ray source of the plurality of x-ray sources operates at a second maximum current different from the first maximum current.

5. The system of claim 4, further comprising a cooling system configured to provide different cooling to a first region of the target associated with the first x-ray source and a second region of the target associated with the second x-ray source.

6. The system of claim 4, wherein:
- a third x-ray source of the plurality of x-ray sources operates at the first maximum current;
- the first x-ray source and the third x-ray source are generated by the first electron beam and a third electron beam focused on a first region of the target; and the second x-ray source is generated by the second electron beam directed to a second region of the target different from the first region.

7. The system of claim 6, wherein the first focusing electrode is configured to focus the first electron beam and the third electron beam without focusing the second electron beam.

8. The system of claim 1, wherein;

a first surface of the target is parallel to a longitudinal axis of the target and disposed at a first angle relative to the first electron beam;

a second surface of the target is parallel to the longitudinal axis of the target and disposed at a second angle relative to the second electron beam; and the second angle is different from the first angle.

9. An x-ray system comprising:

a target;

a first electron source configured to generate a first electron beam directed toward a first region of the target at a first angle perpendicular to a longitudinal axis of the target;

a second electron source configured to generate a second electron beam directed toward a second region of the target at a second angle oblique to the longitudinal axis of the target; and a third electron source configured to generate a third electron beam directed toward the second region of the target at a third angle oblique to the longitudinal axis of the target, wherein:

at least one of the second electron source or the third electron source is larger or smaller than the first electron source.

10. The x-ray system of claim 9, further comprising a focusing electrode, wherein:

the first electron source is configured to generate the first electron beam directed toward the target outside of the focusing electrode; and the second and third electron sources are configured to generate the second and third electron beams directed toward the target through the focusing electrode.

11. The x-ray system of claim 9, wherein:

the first electron source is configured to operate at a first maximum current; and the second and third electron sources are configured to operate at a second maximum current different from the first maximum current.

12. The x-ray system of claim 9, wherein:

the first region comprises a first surface angled at a first angle relative to the first electron beam and parallel to the longitudinal axis of the target;

the second region comprises a second surface angled at a second angle relative to the second and third electron beams and parallel to the longitudinal axis of the target; and the second angle is different from the first angle.

13. The x-ray system of claim 9, wherein a first material of the target in the first region is different from a second material of the target in the second region.

14. The x-ray system of claim 9, wherein:

the first electron source comprises a first type of electron emitter; and the second and third electron sources comprise a second type of electron emitter different from the first type of electron emitter.

15. The x-ray system of claim 9, wherein:

the first electron source is configured to direct the first electron beam towards a first focal spot on the target having a first area;

the second electron source is configured to direct the second electron beam towards a second focal spot on the target having a second area; and the first area is different from the second area.

16. An x-ray source comprising:

a target defining a first region with a first slope relative to a longitudinal axis of the target and a second region with a second slope different from the first slope relative to the longitudinal axis;

a first electron source configured to generate a first electron beam in a first focal spot in the first region with a first area on the target; and a second electron source configured to generate a second electron beam in a second focal spot in the second region with a second area on the target, the second area being larger or smaller than the first area, the second area being spatially separated from overlapping the first area, wherein:

the first slope is angled at a first angle relative to a first axis of the first electron beam;

the second slope is angled at a second angle relative to a second axis of the second electron beam; and the second angle is closer to 90° than the first angle.

17. The x-ray source of claim 16, wherein the second electron source and the second area are larger than the first electron source and the first area, respectively.

18. The x-ray source of claim 16, wherein the second electron source is configured to generate the second electron beam with a lower maximum current than the first electron beam and the second area is smaller than the first area.

19. The x-ray source of claim 16, wherein:

the second area is larger than the first area.

* * * * *